HIGH FREQUENCY POWER CIRCUIT

Original Filed Oct. 21, 1959

2 Sheets-Sheet 1

INVENTOR

Charles J. Weidknecht,

BY Paris Haskell & Levine

ATTORNEYS

Aug. 17, 1965 C. J. WEIDKNECHT 3,201,711

HIGH FREQUENCY POWER CIRCUIT

Original Filed Oct. 21, 1959

2 Sheets-Sheet 2

INVENTOR

Charles J. Weidknecht,

BY Paris, Haskell and Levine

ATTORNEYS

United States Patent Office 3,201,711
Patented Aug. 17, 1965

3,201,711
HIGH FREQUENCY POWER CIRCUIT

Charles J. Weidknecht, Willow Grove, Pa., assignor, by mesne assignments, to United Aircraft Corporation, a corporation of Delaware Original application Oct. 21, 1959, Ser. No. 847,814, now Patent No. 3,074,024, dated Jan. 15, 1963. Divided and this application Sept. 22, 1961, Ser. No. 140,129
17 Claims. (Cl. 330—56)

Figures 1, 2:
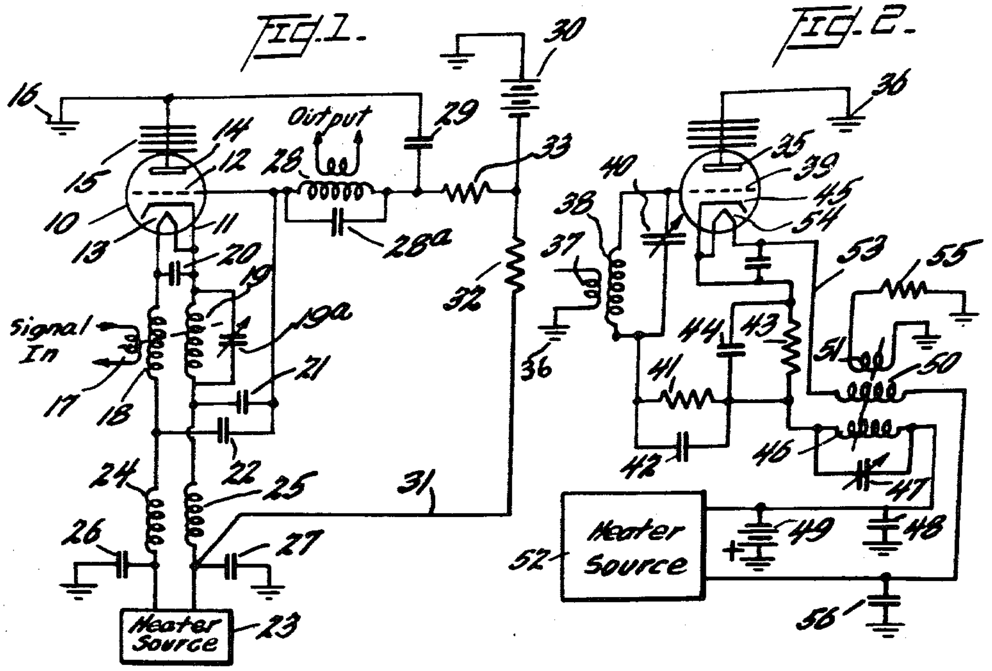

This invention is a division of application Serial No. 847,814, filed October 21, 1959, 3,074,024, January 15, 1963, for High Frequency Power Circuit, and generally relates to improvements in electron tube circuitry for high frequency alternating current signals. The invention particularly concerns such improvements effective to increase the power handling capacity of electron tubes thereby to reduce the size, weight and complexity of the circuits.

In constructing electronic amplifiers, transformers, transmitters, and similar circuitry, employing electron tubes, the size and weight of the overall equipment is to a great extent determined by the size and weight of the tubes which in turn, as presently manufactured, greatly increase in size with increased power rating. One of the important reasons for this rapid increase in tube size that is somewhat out of proportion to the increase in power handling capability, is the relatively inefficient way in which presently designed tubes are cooled or constructed to dissipate heat. Among the various techniques, there is provided the liquid cooled varieties of tubes where a cooling fluid is circulated in a bath about the tube body or about portions of the tube to receive and carry away the heat. Another technique is to provide a multiple fin structure located outside the tube envelope and connected to the plate or other power carrying electrode to dissipate the heat by radiation. In some instances, such fins alone are not adequate for cooling the tube and a motor driven fan is used to circulate air over the fins to enhance the cooling effect.

Obviously, such cooling techniques as have been previously practiced are not the most efficient means for cooling the tube from a heat transfer standpoint and a considerably more effective technique for doing so would be to directly connect the power handling element or electrode in the tube to a large heat sink, such as the chassis of the circuit, and thereby more effectively cool the tube by means of conduction.

To obtain this desired and improved cooling function according to the present invention, there is provided a novel manner of electrically interconnecting the circuit elements of a high frequency electronic amplifier or related circuit whereby the power carrying electrode of the tube may be connected directly to a heat sink chassis and thereby convey the heat away from the electrode both rapidly and efficiently. However, in order to provide this function, the plate or other power handling electrode must also be grounded with respect to both the alternating current and direct current signals of the power being handled by the tube. According to the present invention, this grounded power electrode configuration is made possible by interconnecting the circuit elements in such manner that the input and output circuits are decoupled and properly isolated from the direct current power sources thereby to permit proper functioning of the circuit despite the grounded power electrode connection.

It is accordingly a principal object of the invention to provide a high frequency electronic circuit having components of standard size and weight interconnected to handle increased power without the need for auxiliary cooling equipment.

A further object is to reduce the size and weight of an electronic circuit employing standard and available tubes and components.

Still another object is to provide an electron tube circuit configuration with the power carrying electrodes of the tubes being physically and electrically grounded to a heat sink chassis to provide conduction cooling of the electrode and tube.

Figures 3, 4:
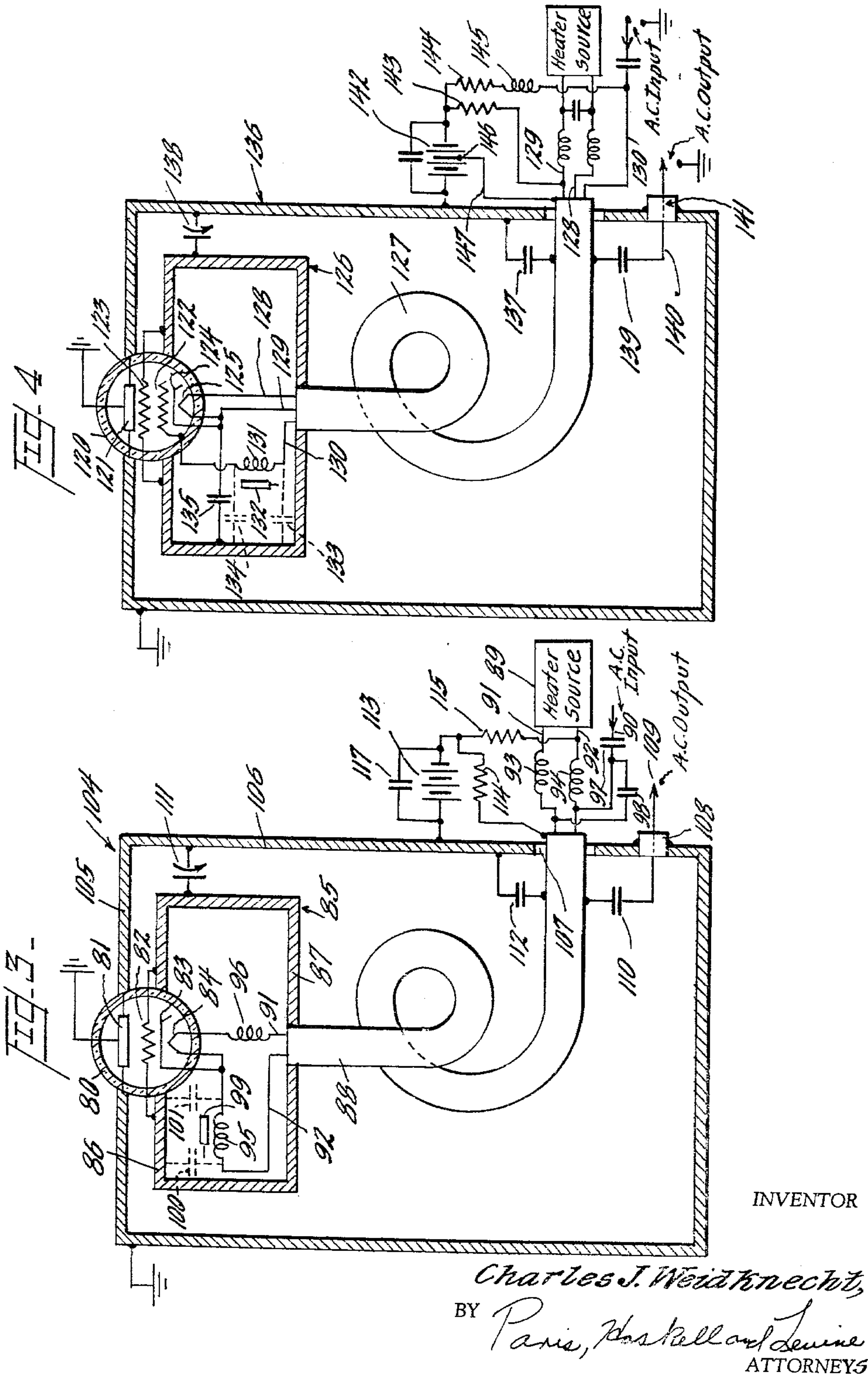

Other objects and many additional advantages will be more readily understood by those skilled in the art after a detailed consideration of the following specification taken with the accompanying drawings, wherein:

FIG. 1 is an electrical schematic diagram illustrating a common grid electron tube amplifier circuit embodying the present invention, FIG. 2 is an electrical schematic diagram, similar to to FIG. 1 and illustrating the invention incorporated in a common cathode amplifier circuit; and FIGS. 3 and 4 are schematic illustrations of additional features of the invention embodied in a triode vacuum tube common grid circuit and a tetrode common cathode circuit, respectively.

Referring now to FIG. 1 for a detailed consideration of one embodiment of the invention, there is shown a high frequency amplifier circuit comprising a single high vacuum electron tube 10 of the triode variety, having a cathode electrode 11, a grid electrode 12, a cathode heater 13 and a plate electrode 14. This tube may be of a well known variety commonly available on the open market and known as a planar power triode for high frequency application. Such tubes are provided with an array of heat radiating fins, 15 connected to the plate electrode, as generally illustrated, for dissipating the heat.

In the customary use of this type tube as an amplifier or in a related circuit, the plate electrode 14 is energized at both direct current and alternating current potentials far above ground potential and the electrode becomes quite hot as a result of the bombardment of electrodes flowing from the cathode element 11. Consequently, the fin structure 15 is used to radiate the heat being generated, and a motor driven fan may also be used to circulate cooling air past the fins 15 to aid in removing the heat. However, according to the present invention the fins 15 are physically and electrically directly connected by soldering or otherwise to the chassis heat sink structure, generally illustrated by the symbol 16, with the result that the complete chassis for housing and supporting all components of this circuit serves as a large heat sink that is directly connected to the plate electrode 14 to conduct away the heat from the plate much more efficiently and rapidly than before. Consequently, by grounding the power handling electrode of the tube 10, this tube may function to control a flow of power many times greater than its rated capacity, or in other words, a much smaller power triode may be used for a given application than heretofore with result that the overall circuit may beconsiderably reduced in size and weight over known power amplifying configurations, not to mention the further size and weight savings being effected by eliminating the need for a motor driven fan commonly used for cooling the fins 15.

Returning to FIG. 1 for an understanding of the circuit configuration, permitting this plate electrode 14 to be grounded to the chassis, the alternating current signal paths first will be described. The input signal is introduced to the primary winding 17 of an input transformer having secondary windings 18 and 19 interconnected in each leg leading to the heater element 13. The upper terminals of each secondary 18 and 19 are connected together by a capacitor 20 which provides a short circuit therebetween at the high frequency of the input signal, but provides a high reactance insofar as the lower frequency heater currents are concerned. The lower terminals of each secondary winding are also connected together by capacitors 21 and 22, which possess a low reactance at the high frequency of the input signal but a higher reactance at the much lower frequency of the heater source 23. The cathode element 11 is connected to the heater lines as shown, and the capacitors 21 and 22 further serve to connect the lower terminals of the secondary windings 18 and 19 to the grid circuit element. As thus far described, therefore it is evident that the high frequency input signal is introduced between the cathode electrode 11 and grid electrode 12 to control the flow of electrons to the vacuum tube 10.

To isolate the input signal from entering the heater source, and thereby to substantially eliminate the stray capacity to ground that would otherwise short circuit the secondary windings 18 and 19, there is provided choke coils 24 and 25, respectively, one in each line of the heater connector leading to the heater source 23. These choke coils 24 and 25 in cooperation with the capacitors 26 and 27, having one side grounded, form an effective filter preventing the high frequency input signal from entering the heater source and being grounded by stray capacity.

On the other hand, the choke coils 24 and 25 as well as the secondary windings 18 and 19 possess very low impedance at the frequency of the heater source 23, whereby the heater current passes through these components in a continuous path to energize the filament 13 of the tube 10.

Considering the alternating current output circuit of the tube 10, the primary winding of a tuned output transformer 28 has its left hand terminal connected to capacitors 21 and 22 to the cathode circuit, since the reactance of the capacitors 21 and 22 is extremely low at the frequency involved. The right hand terminal of transformer primary winding 28 is connected to the grounded plate electrode 14 through a capacitor 29, also having negligible reactance at high frequency. Thus it is evident that primary winding of output transformer 28 is connected across the tube from the plate electrode 14 to the cathode electrode 11 and is energized according to the alternating current signal output of the tube 10.

Considering the direct current circuit paths for energizing the tube, the positive terminal of the direct current supply 30 is directly connected to the chassis, as shown, thereby energizing the plate electrode 14, also grounded as discussed above. From the plate electrode 14, a direct current flows to the cathode 11 and through the transformer winding 19 and choke winding 25, both of the latter representing substantially no resistance to the flow of direct current. After passing through the choke winding 25, the direct current flows over the direct current return line 31 and thence to resistor 32 to the negative terminal of the direct current source 30, thereby completing the circuit. A direct current bias potential is also supplied to the grid electrode 12 by connecting a negative terminal of the direct current source 30 to the grid circuit by means of a resistor 33 as shown.

It is to be particularly noted that this circuit configuration substantially prevents the alternating current signal from passing through the direct current power source 30 or low frequency alternating current heater source 23 while at the same time preventing the direct current from passing through the output load transformer 28. The former isolation is necessary to prevent the alternating current signal from being shortcircuited to ground through stray capacity in the sources 30 and 23, which short circuited connection would disable the high frequency circuit and prevent proper operation.

Thus in the circuit illustrated in FIG. 1, there is provided a means for electrically and physically grounding the plate electrode 14 directly to the conducting chassis for both alternating current, direct current, and heat transfer purposes, thereby enabling the tube to be operated and to handle electrical power far above its rated power capacity.

In FIG. 2, there is shown an alternative vacuum tube amplifier circuit configuration, that in common with the embodiment of FIG. 1, also enables the plate electrode 35 to be physically and electrically grounded to the chassis at 36 to provide the advantages discussed above.

In this alternative circuit configuration, the components are connected differently to provide what might best be termed a common cathode type amplifier. Tracing the alternating current input signals, the high frequency input to the circuit is introduced to primary winding 37 of an input transformer, having one side or terminal of which is grounded to the chassis. The secondary winding 38 is tuned by a capacitor 40 and the upper terminal thereof is connected to the grid electrode 39 of the tube. The lower terminal of the secondary winding is connected through a resistor 41, paralleled by a capacitor 42, in a biasing circuit comprised of a parallel connected resistor 43 and capacitor 44, whose opposite terminal is connected to the cathode electrode 45. As thus far described, therefore, the input signal is coupled across the control grid 39 and cathode through suitable self-biasing means.

In the alternating current signal output circuit, the primary winding 46 of an output transformer, tuned by a variable capacitor 47, is connected between the cathode electrode 45 and ground through a capacitor 48 of low reactance at the high frequency involved. The other terminal of the transformer winding 46 is connected through to the biasing resistor 43, and capacitor 44, which in turn leads to the cathode 45 of the tube. The cathode electrode 45, in turn, receives alternating current from the plate electrode 35 which is physically and electrically grounded to the chassis 36 in the same manner as in FIG. 1. Thus an alternating current signal output circuit may be traced from ground 36 and through the tube from plate 35 to cathode 45, thence through parallel resistor 43 and capacitor 44, and through the primary winding 46, and finally through capacitor 48 and back to ground 36. The capacitor 48 also provides an alternating current shunt path across the direct current potential source 49, thereby preventing the alternating current signal from passing through the direct currents potential source 49 or through the heater source 52.

The output transformer 46 is provided with two secondary windings 50 and 51, with winding 50 being connected in a line 53 leading between the heater source 52 and the heater element 54 of the tube, and with the secondary winding 51 being connected to energize a load generally indicated as resistor 55. The secondary winding 50, located in the heater line 53, serves to introduce an alternating current bucking signal in the line 53 which prevents the transmission of the alternating current output signal to the heater source. An alternating current bypass capacitor 56 also connects the heater line 53 to ground 36 to by-pass high frequency alternating current signals to prevent any signal that succeeds in passing through the secondary winding 50 from reaching the heater source 52.

FIG. 3 illustrates one preferred manner of electromechanically constructing a circuit similar to FIG. 1 for high frequency application and employing distributed components. As shown, there is provided a high frequency power triode, of the type known in the art as a planar triode, and having a plate electrode 81, grid 82, cathode 83, and heater elements 84. As is common in this type tube 80, plate electrode 81 has an outer terminal located at the upper end of the tube, the grid 82 has an outer terminal physically located midway along the length of the tube, and the terminals for cathode and heater electrodes 83 and 84 are physically located at the base.

Enclosing and shielding the grid-cathode circuit of the tube 80 is provided a sealed inner cavity container 85 of conducting material, which as shown, has an upper wall 86 physically and electrically connected with the outer terminal of grid 82 and a lower wall having an opening communicating with the inlet of a hollow conducting tube 88. This inner cavity member 85 completely seals the grid cathode circuit of tube 80 except for the opening communicating with hollow tube 88.

For energizing the heater elements 84 and for injecting a high frequency input signal to the grid-cathode circuit, electrical connecting wires 91 and 92 leading to these electrodes are directed downwardly through the hollow tube 88 and thence connect with the heater source 89 and the high frequency input signal line 90. More specifically, the heater lines 91 and 92 are connected to choke coils 93 and 94, respectively, and thence pass upwardly through hollow tube 88 and through bifilar windings 95 and 96, tuned by a slug 99 to the heater element 84 and cathode 83 which are connected together as shown. The high frequency input signal over line 90 is injected into both lines 91 and 92 through capacitors 97 and 98, and is, therefore, also introduced to the cathode 83.

Considering the high frequency alternating current input to the tube, the alternating current input signal from line 90 is confined within the inner shielding cavity 85 in the inside of hollow tube 88 and introduced in the cathode to grid circuit of the tube 80 by means of a pi network, consisting of the inductance of the bifilar windings 95 and 96 and the distributed capacity represented by the dotted line capacitors 100 and 101, existing between the inner surface of cavity 85 and lines 91 and 92. This high frequency input signal is prevented from passing backwardly into the heater source 89 by the choke coils 93 and 94.

In the alternating current output circuit, there is provided a large outer or main cavity container 104 whose upper wall 105 is physically and electrically connected and sealed to the plate element of tube 80. Thus as discussed above, the outer cavity container member 104 forms a relatively large heat sink for thermally cooling the plate electrode 81 of the tube. All other walls of the outer cavity 104 are closed and sealed except for the right hand wall 106 which is provided with upper and lower openings 107 and 108.

The upper opening 107 is made sufficiently large to permit the hollow tube 88 to extend therethrough, as shown, without contacting the wall 106 of the outer container 104. In other words, there is provided a spacing between the two members or suitable insulation to electrically isolate the tube 88 from the wall 106. The lower opening 108 through the outer container 104 permits an insulated output line to enter the cavity and electrically connect with the outside hollow tube 88 through an alternating current coupling capacitor 110 as shown.

In this common grid configuration, alternating current output signals flow from a plate electrode 81 of tube 80 to the control grid 82 within the tube and thence pass over the outside surface of the iner cavity container 85 and over the outside surface of the conducting tube 88. The hollow tube 88 is deliberately formed in a loop shape to provide an inductance at the high frequency of the signal. To tune this inductance in the output circuit, a small variable tuning capacitor 111 interconnects the inner cavity member 85 with the side wall of the outer cavity member 104. At the lower end of hollow tube 88, there is provided an additional capacitor 112 interconnecting the tube 88 with the outer cavity wall 106. In addition, distributed capacity exists between the hollow tube 88 and the outer cavity 104 with the net result that the tube 88 and various capacities mentioned, form a tuned output circuit for the alternating current signal. Consequently, the alternating current output signal appears on the outer surface of hollow tube 88 and is taken from line 109 connecting with the outside of this hollow tube 88.

For providing direct current energization and biasing of this circuit, a direct current power source 113 has its positive terminal grounded to the outer cavity member wall 106 and its negative terminal energizing a grid biasing resistor 114 and a plate circuit resistor 115. The opposite end of biasing resistor 114 connects with the hollow tube 88 leading to the inner cavity container 85 and, in turn, leads to the control grid 82 thereby establishing a direct current potential between the plate 81 and grid 82. The opposite end of resistor 115 connects with line 92 leading to the cathode 83 thereby establishing a direct current potential between the plate and cathode of the tube.

Recapitulating the operation of the circuit of FIG. 3, there is provided an inner cavity 85 for the tube 80 for containing and shielding the input signal between the control grid and cathode, and an outer cavity 104 for containing and shielding the alternating current output signal in the plate to control the grid circuits. The alternating current input signal from line 90 is introduced in the inner cavity and is coupled between the control grid and cathode by a pi network comprising windings 95 and 96 and distributed capacity 100 and 101.

In the alternating current output circuit, the signal is directed over the outside of hollow tube 88 which is formed in a loop shape to provide a distributed inductance and the distributed capacity from the hollow tube 88 to the inner walls of the outer cavity container 104 together with the tuning capacitor 111 and lower capacitor 112 serve to tune this inductance to the frequency range desired. The direct current energization is provided by a source 113 whose positive terminal is grounded to the outer cavity 104 which in turn is connected to the plate electrode 81 of the tube. The negative terminal thereof connects with plate resistor 115 to energize the plate to cathode circuit and with biasing resistor 114 to bias the control grid 82. The alternating current, direct current, and low frequency heater signals are all decoupled from one another by the chokes 93 and 94 and by capacitors, such as 117, across the direct current source 113.

FIG. 4 illustrates the electromechanical configuration of a distributed component circuit similar to FIG. 3 but employing a high frequency powered tetrode tube 120 in a common cathode circuit configuration. In general, the mechanical circuit arrangement is quite similar to that of FIG. 3, but the electrical connections are varied to provide an alternating current output signal taken from the plate-cathode circuit of tube 120 rather than from the plate-control grid.

The tube 120 is of the high frequency planar power type and comprises a plate electrode 121, a control grid 122, an additional grid 123, a cathode 124, and heater 125. To contain and electrically shield the alternating current input signal circuit, there is provided an inner cavity container 126 which is physically and electrically sealed to grid 123, and completely encloses both of the grids and the cathode 124 and filament 125 except for a lower inlet leading into a hollow tube 127 through which the heater and cathode wires 128, 129 and alternating current signal wire 130 may enter the inner cavity 126.

The alternating current input signal is conducted over line 130 and directed to the control grid 122 through a pi network comprised of an inductance 131 tuned by a slug 132, and the distributed capacities 133 and 134 existing between the inductance 131 and the inner cavity 126, being represented by dotted lines. The cathode electrode 124 is connected to the additional grid 123 and thence to the inner cavity 126 by a capacitor 135 which, at the frequency of the input signal, is essentially a short circuit. Consequently the alternating current input signal over line 130 is applied across the control grid 122 to cathode circuit to energize the tube 120.

In the alternating current output circuit, the cathode is coupled to inner cavity 126 by a capacitor 135, whereby the alternating current signal from the plate electrode to the cathode 124 is directed over the outside of inner cavity 126 and thence over the outside of hollow tube 127 that is formed in a loop shape, as in FIG. 3, to provide an inductance of the high frequency involved. This inductance is tuned by the distributed capacity existing between the hollow tube 127 and outer cavity 136 as well as by the capacitor 137 and tuning capacitor 138, all as described above in FIG. 3, to provide a tuned output circuit for the alternating current signal. The alternating current signal is, therefore, taken from the hollow tube 127 and directed over output capacitor 139, line 140, and coaxial transmission line 141 to be directed outside the outer cavity 136 into a suitable load, not shown.

In the direct current energizing circuit, a direct power source 142 has its positive terminal connected to the outer cavity 136 and thence to the plate electrode 121 of electron tube 120, and its negative terminal connected to a resistor 143 connecting to the cathode 124 over line 129. The negative terminal of source 142 also is connected to a bias resistor 144 and decoupling choke 145 to input line 130 leading to the control grid 122 and hence supplies a negative direct current bias to the control grid 122. To provide direct current energization of the additional grid 123, a lesser negative potential, which may be taken from the tap 146 of the direct current source, is applied over line 147 to the hollow tube 127 leading to the additional grid 123. This establishes the additional grid at a positive potential with respect to the control grid 122 of the tube.

As in all of the circuits discussed above, the power carrying plate electrode 121 is physically and electrically grounded to the outer cavity 136, whereby the cavity walls constitute a large heat sink chassis to dissipate the heat being generated in the electron tube and increase the power handling capability of the circuiting components. The inner and outer cavities 126 and 136 also provide the necessary shielding to both decouple and isolate the different circuits and provide the functions desired.

It is evident that relatively few of the many possible circuit configurations have been illustrated and described herein and accordingly many modifications may be made by those skilled in the art without departing from the spirit and scope of the invention. Accordingly, this invention should be considered as being limited only by the following claims.

What is claimed is:

1. In a high frequency electronic circuit, an electron valve having a plurality of elements wherein electrons flow to a power carrying elements from a second element and at least one additional element regulates the intensity of the electron flow, an inner cavity container forming an electrical shielded enclosure for said second element and said additional element and being directly connected to one of said elements enclosed, means for injecting a high frequency signal into the inner cavity and applied across the elements enclosed therein, an outer cavity container directly connected to said power carrying element and enclosing said inner cavity, tuned circuit output means interconnecting said inner cavity container and outer cavity container, and output terminal means coupled to said tuned circuit means and to said outer cavity container for conveying an alternating output signal.

2. In the circuit of claim 1, said means for injecting the input signal including a hollow tube passing through the outer container cavity and opening into the inner cavity, and said hollow tube being arcuately configured whereby its outside surface provides an inductance for said tuned circuit.

3. In the circuit of claim 1, said electron tube comprising a planar triode wherein said second element is the cathode and said additional element is the control grid, and said inner cavity container is directly connected to the control grid.

4. In the circuit of claim 1, said electron tube comprising a planar tetrode where said second element is the cathode, and said additional element is a control grid, and having a second additional element as a further grid, said inner cavity container being directly connected to said further grid and capacitor coupled to said cathode.

5. In an electronic circuit, an electron valve having a plurality of elements wherein most of the electrons flow between a first element and a power carrying element and at least one additional element regulates the intensity of the electron flow, a relatively large chassis having high electrical and thermal conductive properties, means coupling an alternating input signal to the valve across said first element and said additional element, and means coupling an output signal from said valve between said power element and one of said first and additional elements whereby that one of said first and additional elements is in common circuit connection between the alternating input and output signals, means providing a large area high heat conduction path for physically and electrically connecting said power carrying element to the chassis thereby to conduct away the heat being generated in the power carrying element, and means coupling one terminal of a direct current power source to said chassis, and applying the other terminal thereof to that one of said first and additional elements that is coupled to the output signal, means for applying a D.-C. biasing signal between said first and additional elements comprising a series connected resistor and a capacitor shunting said resistor to by-pass high frequency A.-C. signals, said input signal coupling means including an inner cavity container forming a shielded enclosure about the portion of the valve connections for said first and an additional element and including a means for coupling the input signal within said inner cavity member to energize said enclosed elements, and said chassis including an outer cavity container directly connected to the power element and enclosing said inner cavity, and tuned circuit means coupled between the outer cavity container and the inner cavity container for deriving said output signal.

6. A high frequency vacuum tube circuit of increased power handling capacity comprising:

a vacuum tube having a plate, cathode, and grid electrodes, a container of high electrical conductivity coupling the grid and cathode electrodes of the tube, a second container of high thermal electrical conductivity for coupling the plate electrode of the tube to the first container, said second container being grounded to a heat sink to provide a common electrical ground and a common thermal heat sink at said plate electrode, a signal transmission path having a shielding conductor for coupling an input signal within the first container to energize the grid and cathode electrodes of the tube, said shielding conductor being directly connected to to the wall of the first container and being inductively coupled to the wall of the second container to provide an output signal transmission path from the plate electrode to the first container that is shielded from the input transmission path by said shielding conductor.

7. In the high frequency circuit of claim 6, said signal transmission path comprising an elongated hollow tube of conducting material having one end directly connected to the wall of the first container and having its interior opening into the first container, and means for applying the input signal within the hollow tube to energize the grid-cathode circuit of the tube.

8. In the high frequency circuit of claim 6, said signal transmission path comprising a coaxial line having an inner conductor and an outer shield with the inner conductor being coupled to one of said grid and cathode electrodes and said outer shield being directly connected to the walls of the first container.

9. A high frequency electronic circuit for a planar vacuum tube having a plate, a grid, and a cathode, a first cavity forming conducting wall for coupling the grid and cathode of the tube and having the conducting wall directly connected to one of the cathode and grid electrodes, a second cavity forming conducting wall coupling the plate electrode and the first cavity wall with the plate electrode being directly connected to the second cavity wall, means for applying direct current energization between the plate electrode and each of the grid and cathode electrodes, means for directly connecting the second cavity wall to a common ground heat sink thereby to provide a direct path for direct and alternating current conduction, and thermal conduction from said plate electrode to said common ground heat sink, a two channel signal transmission path comprising an input signal channel and an output signal channel for respectively conveying input and output signals to the circuit and having an electrical conductor that is common to both signal channels and shielding each signal channel from the other, said input signal channel being energizable by an input signal and applying the input signal within the first cavity forming wall to energize the grid and cathode circuit of the tube, and said output signal channel being coupled between the first and second cavity forming walls to convey an output signal from the plate electrode to the grid-cathode circuit of the tube, and said common electrical conductor for the two channels electrically shielding the input signal from the output signal.

10. In the high frequency electronic circuit of claim 9, said two channel signal transmission path comprising an elongated hollow tube of conducting material, means for applying said input signal within the hollow tube, and means for obtaining the output signal from the wall of the second cavity wall to the outer surface of the hollow tube, the conducting surface of the hollow tube providing a common electrical conductor to shield the input signal within the hollow tube from the output signal outside of the hollow tube.

11. In the high frequency of the circuit of claim 9, said two channel signal transmission path comprising a coaxial transmission line, having an inner conductor and an outer shielding conductor, means for transmitting the input signal between the inner conductor and the shielding conductor, and means for obtaining the output signal from the conducting wall of the second cavity tube to the outer shielding conductor of the transmission line, said outer shielding conductor of the transmission line providing a common conductor between the input and output signals that shields the input and output signals from each other.

12. A high frequency vacuum tube circuit of increased power handling capacity comprising:

a vacuum tube having a plate, cathode, and grid, a hollow container of high electrical conductivity coupling the cathode and grid electrodes of the tube, a second container of high electrical and thermal conductivity coupling the plate electrode of the tube to the first hollow container, said plate electrode being short-circuited to the second container for both electrical and thermal conduction therebetween, a coaxial transmission line having an inner and outer conductor, said line being arcuately configured along its length, at one end of said line said inner and outer conductors being coupled between said first container and one of said grid and cathode electrodes of the tube to apply an input signal to the grid-cathode circuit of the tube, said coaxial line being disposed with respect to said second container to inductively couple the outer conductor of said line to the wall of said second container thereby to transmit an output signal between the wall of said container and the outer conductor of said transmission line, whereby the outer conductor of the coaxial transmission line is in common to both the input and output signals and electrically shields one from the other.

13. In the circuit of claim 12, said coaxial transmission line being elongated at the frequency of the input and output signal to provide a lumped inductance along its length, means for alternating current coupling one end of the outer conductor of the coaxial line to the wall of the second container and directly coupling the outer conductor of the coaxial line to the wall of the first container, means for applying an alternating current input signal between the inner and outer conductors of the coaxial line, and means for obtaining an alternating current output signal from the outer conductor of the coaxial transmission line to the wall of the second container.

14. A high frequency electron tube circuit comprising:

a container of conducting material, an electron tube within the container and having a plate, cathode, and grid electrodes, said plate electrode being directly connected to the container for electrical and thermal conduction therebetween and said container adapted to be supported on a grounded heat sink of large thermal capacity, a signal transmission member having a shielding conductor of sufficient length to provide inductance at the frequency range of the circuit, said transmission member extending into the container, said transmission member being coupled to the grid-cathode circuit of the tube and means for applying an alternating input signal to the transmission member to energize the grid-cathode circuit, means for applying direct current potential between the shielding conductor of said transmission member and said container to energize and bias the tube, means for disposing the shielding conductor of said transmission member with respect to the wall of the container to inductively couple the shielding conductor to the walls of the container thereby to provide a signal output circuit for coupling the plate electrode to the grid-cathode circuit, capacitor means interconnecting the shielding conductor to the container to resonantly tune the inductance to the frequency of the output signal, and means for coupling an output signal from the wall of the container to the shielding conductor of the transmission member whereby said shielding conductor is in common to both the input and output signals.

15. A high frequency electron tube circuit comprising:

a container of high thermal and electrical conductivity supported with respect to a heat sink ground, an electron tube having a plate electrode directly connected to the container and having a grid electrode and a cathode electrode, a signal transmission member for conveying a high frequency input signal and having a shielding conductor for said signal and serving as one terminal thereof, means for applying an input signal to said member at one end and coupling the other end to energize the grid-cathode electrodes of the tube, means for disposing said shielding conductor along its length in inductively coupled relationship with the container, means for capacitively coupling said shielding conductor to the container near the end proximate the coupling to the grid-cathode circuit to resonantly tune the inductance provided thereby, means for capacitively coupling said shielding conductor to said container near the other end thereof for receiving the input signal, and means for obtaining an output signal from the plate electrode to the grid-cathode circuit, said means including means coupled between said container and said shielding conductor at a location along said shielding conductor that is intermediate the opposite ends thereof.

16. In the circuit of claim 15, said signal transmission member comprising a coaxial line having an inner conductor and an outer shielding conductor.

17. In a high frequency circuit comprising an electron tube having a plate, control grid and cathode, a high frequency electromagnetic shield for said tube comprising a heat sink body, means directly connecting said plate to the shield to provide conduction therebetween for both alternating current and direct current signals as well as thermal conduction, a high frequency cavity coupling said control grid and cathode, a high frequency signal transmission member including a hollow conductor coupled to said cavity, means for directing an input signal within said hollow conductor to energize the control grid and cathode circuit of the tube, said hollow conductor having a curved outer surface along its length whereby its outer surface provides a distributed inductance at the frequency of the alternating current signals, capacitor means coupling the outer surface of said hollow conductor to the heat sink body to tune said distributed inductance, whereby an output signal is derived from between said plate and said grid-cathode circuit across said distributed inductance.

References Cited by the Examiner

UNITED STATES PATENTS

| | | | |
|---|---|---|---|
| 2,554,502 | 5/51 | Priest | 330—56 |
| 2,731,562 | 1/56 | Miyaji | 330—56 X |
| 2,745,910 | 5/56 | Dehn | 330—56 |
| 2,784,262 | 5/57 | Crow | 330—14 |

ROY LAKE, *Primary Examiner.*

NATHAN KAUFMAN, *Examiner.*